US012662993B2

(12) United States Patent
Howison et al.

(10) Patent No.: US 12,662,993 B2
(45) Date of Patent: Jun. 23, 2026

(54) ENERGY STORAGE DEVICE WITH A VARIABLE VOLUME CHAMBER

(71) Applicant: IDEA INVENT EVOLVE PTY LTD, Queensland (AU)

(72) Inventors: Scott Howison, Queensland (AU); Sven Du Clou, Queensland (AU); Samuel Mccarthy, Queensland (AU)

(73) Assignee: IDEA INVENT EVOLVE PTY LTD, Tamborine Mountain (AU)

( * ) Notice: Subject to any disclaimer, the term of this patent is extended or adjusted under 35 U.S.C. 154(b) by 0 days.

(21) Appl. No.: 18/840,427

(22) PCT Filed: Mar. 8, 2023

(86) PCT No.: PCT/AU2023/050156
§ 371 (c)(1),
(2) Date: Aug. 21, 2024

(87) PCT Pub. No.: WO2023/183961
PCT Pub. Date: Oct. 5, 2023

(65) Prior Publication Data
US 2025/0163899 A1    May 22, 2025

(30) Foreign Application Priority Data

Mar. 30, 2022    (AU) ................................ 2022900802
Sep. 1, 2022    (AU) ................................ 2022224818

(51) Int. Cl.
*F03G 7/06*    (2006.01)
*F15B 1/10*    (2006.01)
(52) U.S. Cl.
CPC .......... *F03G 7/06112* (2021.08); *F15B 1/103* (2013.01)

(58) Field of Classification Search
CPC .. F03G 7/06112; F03G 7/008; F03G 7/06324; F03G 7/0252; F03G 7/0254;
(Continued)

(56) References Cited

U.S. PATENT DOCUMENTS 4,367,786 A    1/1983    Haefner
4,610,369 A *  9/1986    Mercier .................... F15B 1/10
92/92
(Continued)

FOREIGN PATENT DOCUMENTS

CA        2467287 A1    11/2005
DE    102011018679 A1    10/2012
WO      2020249267 A1    12/2020

*Primary Examiner* — Hoang M Nguyen
(74) *Attorney, Agent, or Firm* — Maschoff Brennan

(57)    ABSTRACT

A mechanical energy storage device comprising an expandable and contractable, sealed primary chamber with a sealed variable internal volume containing an expandable/compressible primary fluid. An external medium or a secondary chamber that resists expansion of the primary chamber surrounds the primary chamber. An input mechanism that is actuated by an external force, manipulates formers to transform the primary chamber shell such that the sealed primary chamber increases in volume and the expanding fluid contained within reduces in pressure causing a partial vacuum pressure differential between the fluid and the surrounding medium, or secondary chamber, allowing energy to be stored. When the external force is removed, the pressure differential works to decrease the volume of the sealed primary chamber driving the output mechanism. A locking mechanism allows for the device to store energy, for it to be decoupled and transported, and for the energy to be extracted later.

25 Claims, 6 Drawing Sheets

(58) Field of Classification Search
CPC ...... F15B 1/103; F15B 2201/315; F15B 1/14;
F15B 2201/32; Y02E 60/16
See application file for complete search history.

(56) References Cited

U.S. PATENT DOCUMENTS

| 5,141,412 | A | * | 8/1992 | Meinz ................... F04B 43/086 |
| | | | | 92/37 |
| 2011/0220419 | A1 | | 9/2011 | Sjoedin et al. |
| 2012/0211112 | A1 | | 8/2012 | Barth et al. |
| 2013/0247751 | A1 | * | 9/2013 | Baseley ..................... F15B 1/04 |
| | | | | 92/90 |
| 2015/0192114 | A1 | | 7/2015 | Triebel et al. |
| 2015/0330357 | A1 | | 11/2015 | Saxe |
| 2016/0008544 | A1 | * | 1/2016 | Reisenburg Molson ..................... A61M 5/2033 |
| | | | | 604/196 |
| 2021/0095644 | A1 | | 4/2021 | Abaitancei et al. |

* cited by examiner

[Fig. 3]
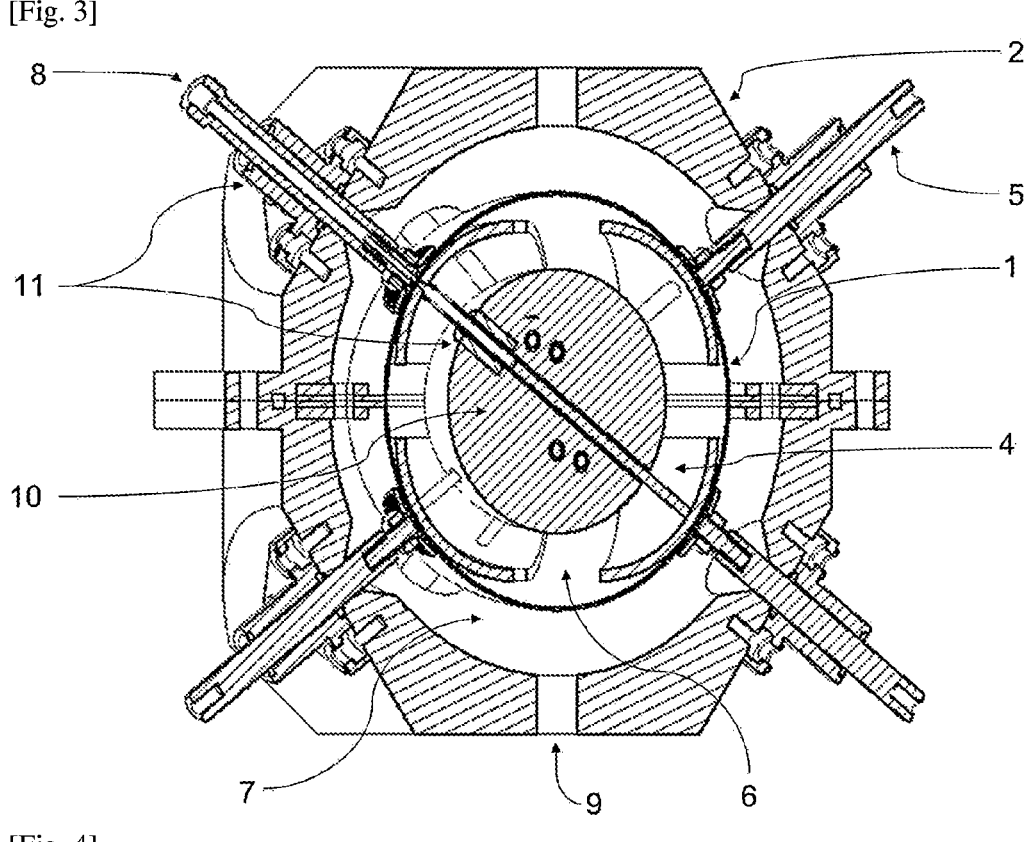
[Fig. 4]
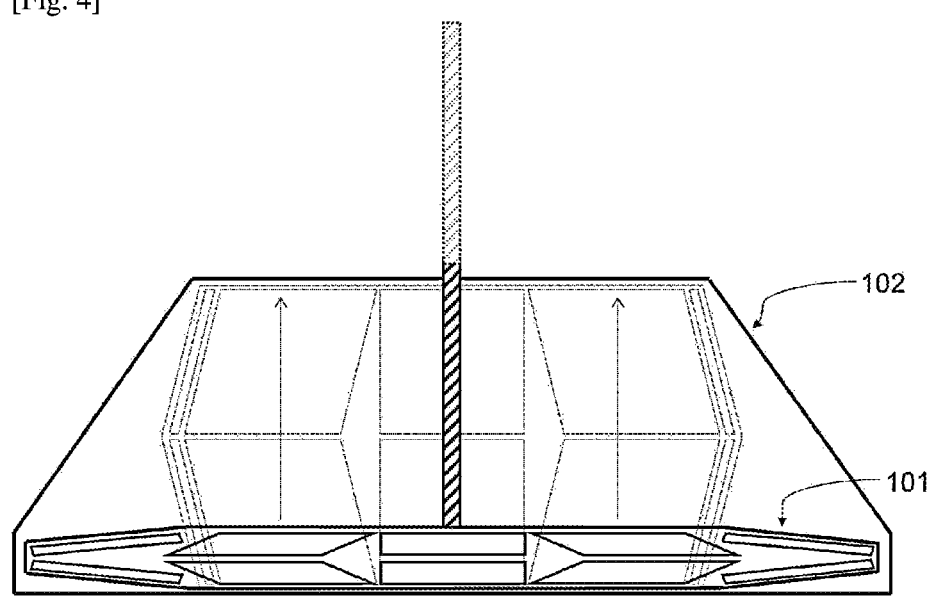

[Fig. 5]
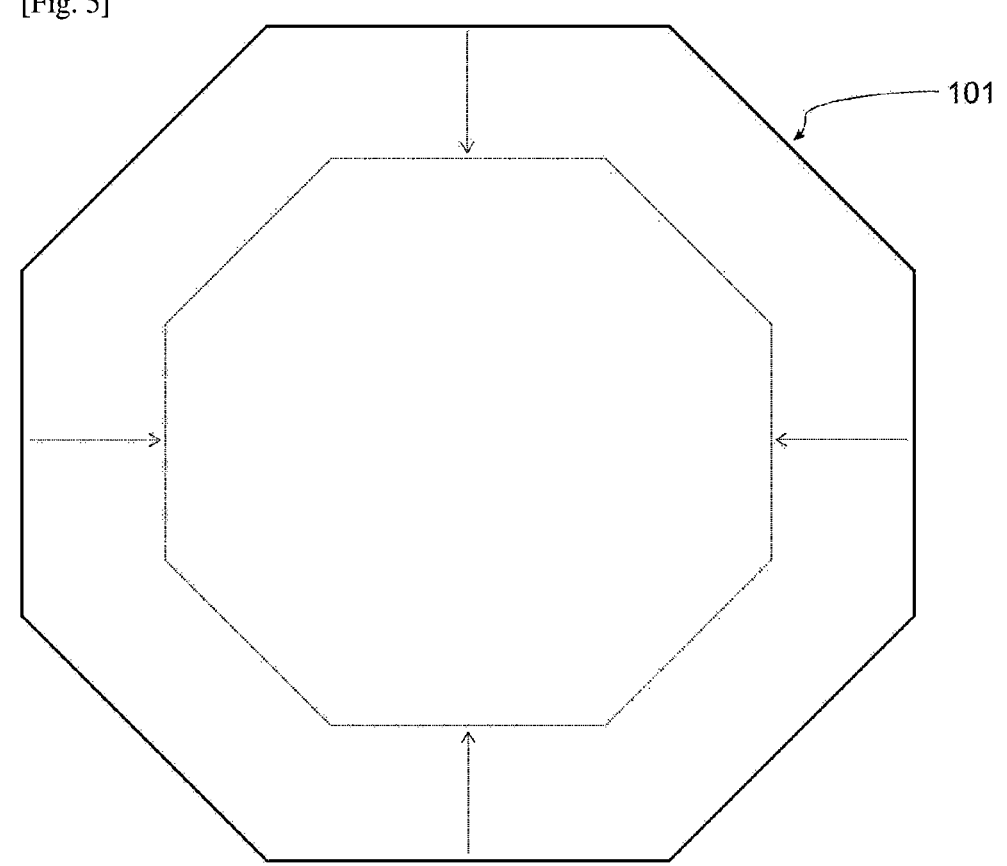

[Fig. 6]
(A)
(B)
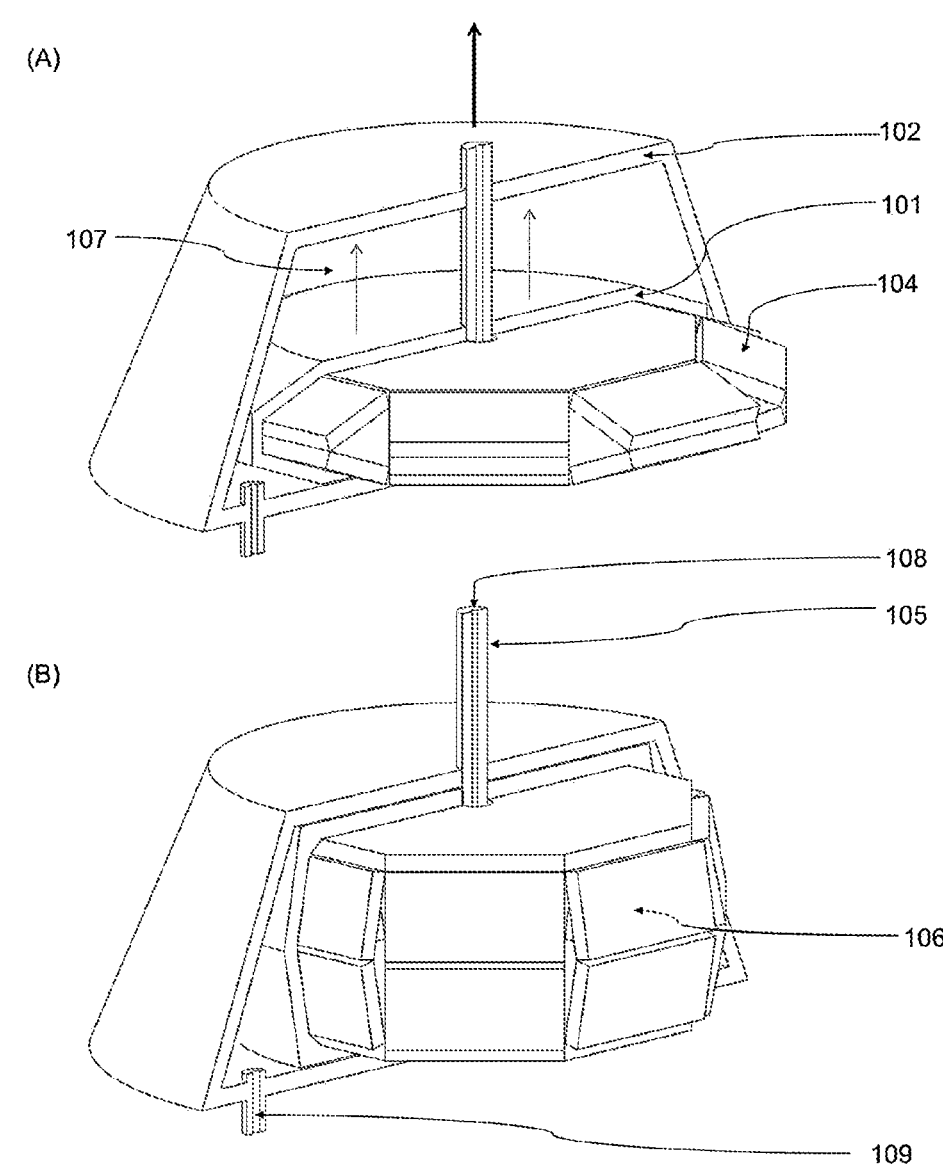

[Fig. 7]
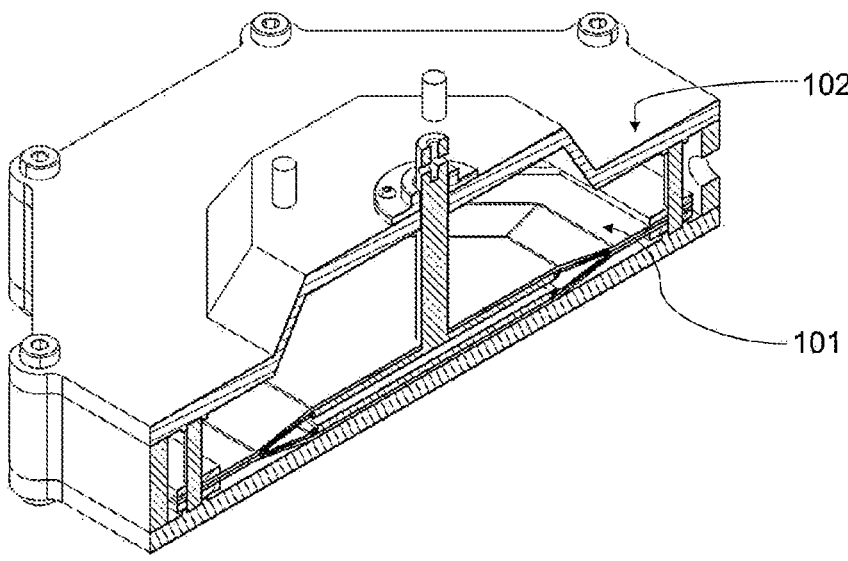
[Fig. 8]
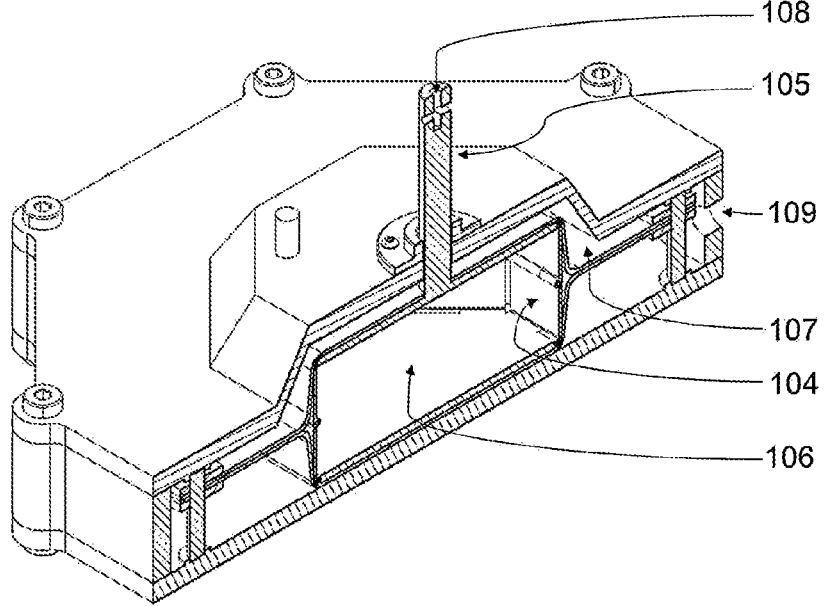
[Fig. 9]
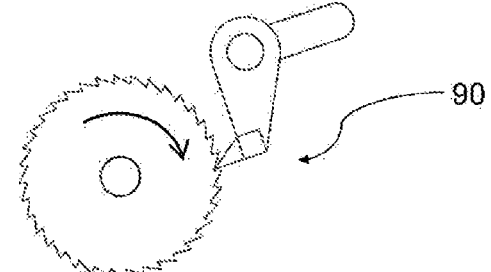

[Fig. 10]
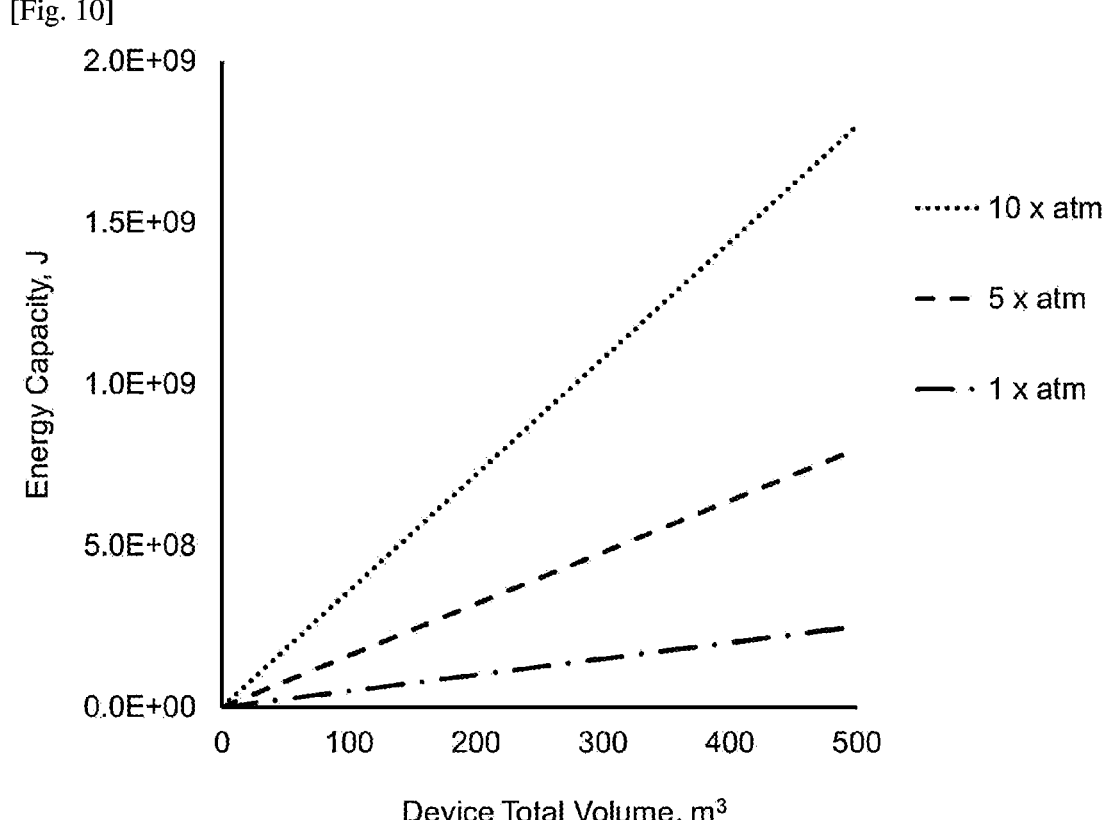

ENERGY STORAGE DEVICE WITH A VARIABLE VOLUME CHAMBER

TECHNICAL FIELD

The present invention relates to energy storage. In particular, the present invention relates to a manner of storing energy by employing a sealed variable volume chamber.

BACKGROUND OF THE INVENTION

The following references to and descriptions of prior proposals or products are not intended to be and are not to be construed as, statements or admissions of common general knowledge in the art. In particular, the following prior art discussion does not relate to what is commonly or well known by the person skilled in the art, but assists in the understanding of the inventive step of the present invention of which the identification of pertinent prior art proposals is but one part.

Forms of energy storage are required for a number of applications, from providing power for cordless consumer goods to enabling grid power to be stored during times of low demand for later use in peak periods. Modern trends towards renewable energy sources have resulted in intermittent energy generation technologies that have an output largely dependent on the weather (i.e., Solar and wind). For this reason, among others, periods of maximum energy production do not always coincide with peak electricity demand, necessitating energy storage.

There have been many innovations which aim to solve the energy storage problem; electrochemical batteries, gravity batteries, pumped hydro, compressed air energy storage, springs, and flywheels, each with their own advantages and limitations. Electrochemical batteries can have a high energy density and efficiency but have relatively short lifetimes and environmental considerations. Gravity batteries store potential energy by lifting solid matter to higher elevations with low energy density and efficiency. Pumped hydro has a long life, but requires complex infrastructure and a very specific topographic location to be a viable solution. Compressed air energy storage is less dependent on geographic location but is relatively inefficient due to energy lost in pumping systems. Such systems require either i) a compressor to pressurise fluid into a fixed volume chamber, ii) heating elements to increase the temperature and pressure of a fluid in a fixed volume chamber, or iii) hydraulic compression of the chamber itself to increase the pressure of the fluid contained. Springs are usually employed in suspension or small-scale energy storage applications. Flywheels are efficient mechanical energy storage devices with inherently large inertia storing kinetic energy, but can provide instantaneous energy over short periods.

Further innovation in energy storage is desirable to improve the energy storage options and increase capacity to encourage renewable energy generation.

The present invention seeks to provide an energy storage system which may ameliorate the foregoing shortcomings and disadvantages or which will at least provide a useful alternative.

SUMMARY OF INVENTION

The invention can be generally described as a mechanical Energy Storage (ES) device that stores potential energy in the form of a pressure differential between two separated fluids, or a vacuum. The stored energy can be converted to kinetic energy on demand.

According to one aspect of the invention, there is provided a device, comprising an expandable and contractable, sealed primary chamber with a sealed variable internal volume containing an expandable/compressible primary fluid. A medium that resists expansion of the primary chamber surrounds the primary chamber. An input mechanism increases the volume of the sealed primary chamber when energy is put into the device. An output mechanism is driven by the primary chamber when it decreases in volume, due to a pressure differential, which allows energy to be extracted from the device. When the input mechanism is actuated by an external force, the sealed primary chamber increases in volume and the expanding fluid contained within reduces in pressure causing a partial vacuum pressure differential between the fluid and the surrounding medium. When the external force is removed, the pressure differential works to decrease the volume of the sealed primary chamber driving the output mechanism.

In exemplary embodiments, the primary chamber is enclosed by a rigid sealed secondary chamber, containing a compressible fluid.

According to preferred embodiments, the device is able to reduce mechanical vibrations by operating as a spring-damper.

In another preferred embodiment, the device further comprises a locking mechanism for selectively preventing expansion or contraction of the primary chamber to maintain a steady volume of the primary chamber. The locking mechanism may be a ratchet and pawl mechanism which, when engaged, mechanically prevents the primary chamber from decreasing in volume thereby allowing energy to be stored and transported, and, when disengaged, allows stored energy to be discharged.

A preferred design characteristic is that the primary chamber is able to expand and contract whilst maintaining a pressure seal via an innovative flexible and transformable geometry shell. The shell employs an elastomer material, rigid sliding or hinging surfaces (formers) or a combination thereof, that provides a rigid support whilst maintaining a pressure seal for the transforming shape when it is expanding or contracting and subjected to a pressure differential.

An energy convertor such as a mechanical-electrical motor/generator can be connected to the input/output mechanism.

According to preferred embodiments, the primary chamber has a fluid intake valve exposed to the surrounding medium; wherein, opening the intake valve of said device causes an exchange with the surrounding medium such that the pressures equalise. In embodiments having a secondary chamber, the secondary chamber has a fluid outlet valve exposed to the surrounding medium; wherein, opening the outlet valve of said device causes an exchange with the surrounding medium such that the pressures equalise. A system of multiple devices can be provided whereby the valves of different devices can be coupled via manifolds.

Exemplary embodiments of the Energy Storage (ES) device described herein, stores energy as an expanded fluid inside a variable volume chamber providing an alternative energy storage solution, with its own unique advantages and for a multitude of applications. The system energy density is increased when the surrounding medium pressure increases such as for when a secondary chamber is employed. A few benefits of the invention include scalability, modularity, transportability, light-weight, it can be designed to accommodate various input and output forms of energy and would provide a viable alternative to the aforementioned technologies. The ES device would also be able to be incorporated in new hydraulic or pneumatic applications, by using the available vacuum or pressurised chamber fluids directly. Furthermore, the device can be used for thrust and energy storage applications in space.

BRIEF DESCRIPTION OF DRAWINGS

The invention may be better understood from the following non-limiting description of preferred embodiments, in which:

FIG. 1 is a cross-sectioned illustration of a spherical embodiment of the energy storage device with an internal mechanism, primary chamber, and outer secondary chamber.

FIG. 2 is a cross-section illustration of the device of FIG. 1 with an external mechanism.

FIG. 3 is a 3D cross-section design drawing of the spherical device in FIG. 2.

FIG. 4 is a side view drawing showing an octagonal hinged disk embodiment of the device with an external mechanism that only requires tension in one direction to expand the device.

FIG. 5 is a top view drawing of the octagonal hinged disk embodiment shown in FIG. 4.

FIG. 6 is isometric view drawings of the octagonal hinged disk embodiment shown in FIG. 4.

FIG. 7 is a 3D cross-section drawing of an octagonal hinge disk embodiment.

FIG. 8 is a 3D cross-section drawing of the octagonal device in FIG. 7 in the expanded state.

FIG. 9 is an example of a locking mechanism, a ratchet and pawl, that can incrementally lock the energy in the device as it charges, so that it can be transported and released later.

FIG. 10 presents a graph showing the expected energy capacities for a continuous range of expanding sphere device sizes, with a discrete range initial pressure in the secondary chamber.

DETAILED DESCRIPTION

A detailed description of one or more of the embodiments of the present invention are presented herein by way of exemplification and not limitation with reference to the Figures.

The device is comprised of:

An expandable and contractable, transformable geometry, sealed primary chamber with variable volume. The flexible or transformable geometry chamber shell makes use of an elastomer material, rigid sliding or hinging surfaces (formers) or a combination thereof, that provides rigid support whilst maintaining a pressure seal. The primary chamber may be evacuated or contain a fluid (including liquid, gas or a phase changing fluid).

An external medium that resists the expansion of the primary chamber or an optional rigid sealed secondary chamber. The secondary chamber contains a fluid.

An input mechanism which can increase the volume of the primary chamber when energy is put into the device, and an output mechanism driven by a pressure differential working to collapse the primary chamber volume, which can transfer the stored energy to do useful work.

The device has a locking mechanism which can hold the primary chamber volume at its set position to store energy. An ideal locking mechanism is a ratchet and pawl mechanism 90, see FIG. 9.

An energy convertor connected to the input/output mechanism

Valves connected to the primary and secondary chambers that allow for drawing and/or expelling the contained fluid for certain applications.

The device is charged when an external force or kinetic energy is delivered to the input mechanism. The input could be rotational or linear kinetic energy transferred through pulleys or gearing such as a rack and pinion, or a combination thereof. It can be geared to provide the appropriate torque, speed and displacement for the charging process. The input mechanism drives the transformable geometry shell of the primary chamber apart therefore expanding the volume of the primary chamber, causing the fluid inside the primary chamber to expand and decrease in pressure resulting in a partial vacuum pressure differential between the primary chamber and the surrounding medium. When the primary chamber expands the fluid inside the secondary chamber, if present, compresses and increases in pressure. This amplifies the pressure differential between the primary and secondary chambers. Note that embodiments of the invention may omit the secondary chamber, in which case the pressure differential is between the primary chamber and the pressure of the medium surrounding the primary chamber, such as air or a hydrostatic water head. The benefit of the secondary chamber is that it can be pre-pressurised increasing the energy density of the device by creating a larger pressure differential for a given volume increase in the primary chamber. To optimise the energy density of the storage device, the secondary chamber should be designed so that the internal surface area has similar geometry to the primary chamber when fully expanded. Other embodiments allow for the secondary chamber to be open to a vacuum to assist expansion of the primary chamber.

As the device charges and the primary chamber expands, a force caused by the pressure differential acts to collapse the primary chamber such that when the external force is removed, the pressure differential works to decrease the volume of the primary chamber, recompressing the fluid, driving the output mechanism.

A locking mechanism, when activated, provides a reaction to this force, preventing the primary chamber from contracting. It enables the energy to be stored and or transported for later use.

To discharge the device, the lock can be disengaged which allows the primary chamber to collapse as the pressures inside the primary and secondary chamber (or external medium) equalise. The contracting primary chamber drives the output mechanism which can be used to do useful work. The output mechanism could be rotational or linear kinetic energy transferred through pulleys or gearing such as a rack and pinion, or a combination thereof. It can be geared to provide the appropriate torque, speed and displacement for the application, connected to an electric generator or the chambers can be used directly for drawing in or expelling fluid and can be used to drive a turbine-generator. Another potential application is a spring-damper to reduce vibrations.

Figures 1, 2:
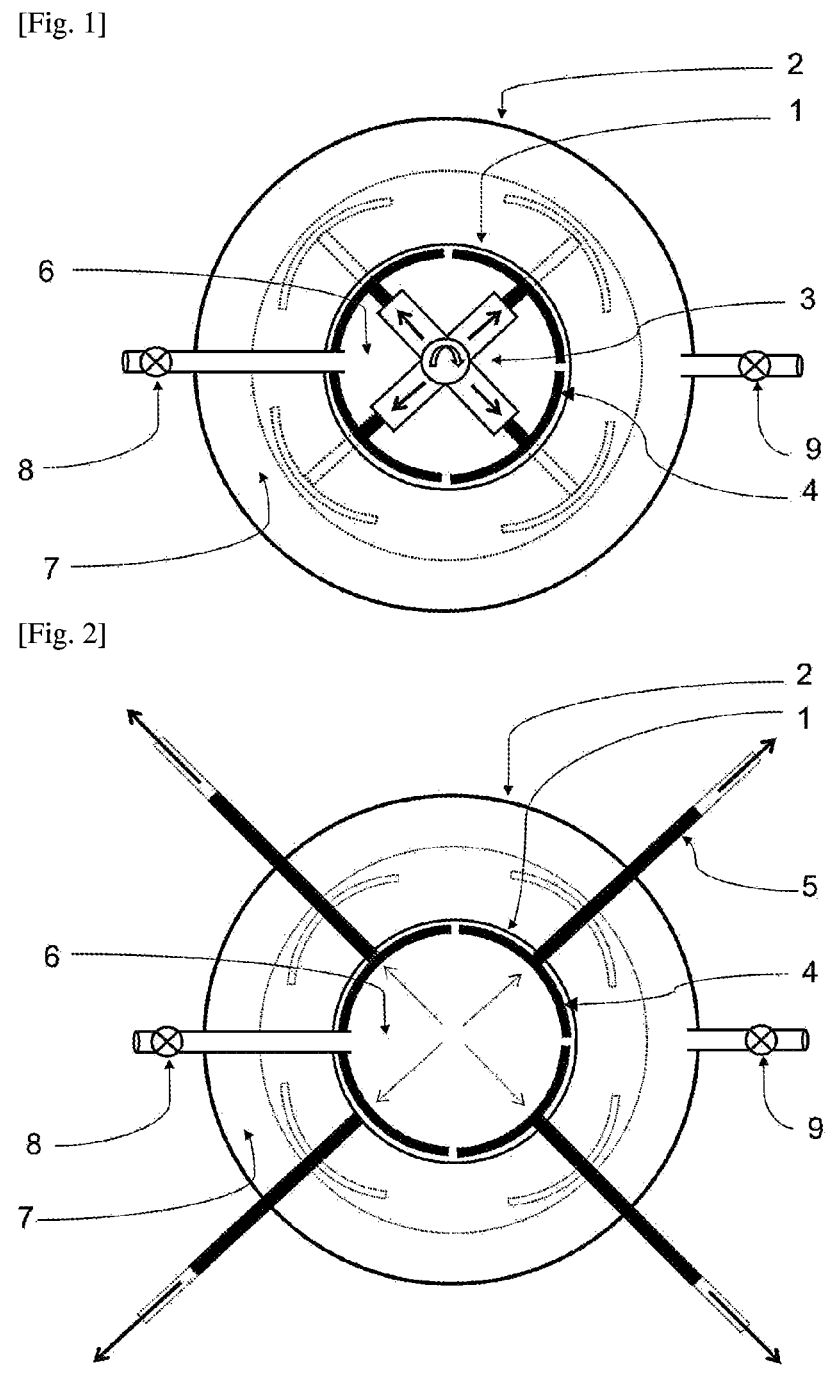

An embodiment of the invention is shown in FIG. 1 with an internal mechanism 3 and FIG. 2 with an external mechanism 5 for transferring the energy into the energy storage device. These embodiments resemble a sphere, although they could be any conceivable three-dimensional shape. The section-view in [FIG. 3] shows the primary variable-volume chamber 6 enclosed by the primary chamber shell 1 that is sealed and can vary in size by employing a flexible elastic polymer material and/or a transformable geometry. The secondary chamber volume 7 is enclosed by the fixed secondary chamber shell 2 and the expandable primary chamber shell 1 and could be replaced by installing the primary chamber in any external medium. The primary chamber shell 1 is supported by rigid formers 4 that are actuated by an internal 3 or external 5 mechanism housed within or external to the variable volume chamber. The mechanism 3 or 5 transfers the input energy to kinetic energy, through a sealed interface/s. The mechanism 3 or 5 drives the formers 4 outward, expanding the primary chamber in three dimensions. The primary chamber shell 1 is allowed to expand, reducing the pressure of the primary chamber 6, up to the boundary of the sealed, rigid secondary chamber shell 2, if present. The secondary chamber 7 volume decreases, thereby increasing in pressure. The increasing pressure differential realised between the primary 6 and secondary chamber 7 is the potential energy stored. Note that if a flexible elastic polymer is employed as a seal for the primary chamber 6, it would provide additional energy storage as it elastically stretches to an increased surface area. A locking mechanism connected to 3 or 5 prevents the system from contracting when the input energy is removed from 3 or 5 and enables the energy to be stored for later use. The process is reversed when the device is used to provide energy at a later stage. A number of output devices (not shown) can be connected to 3 or 5 to provide, for example, reciprocating, rotating, translating motion, or a generator for electricity. Valved outlets 8 and 9 are connected directly to the primary 6 and secondary chambers 7, respectively. This enables low pressure vacuum 8 and high pressure outlet ports 9 to be utilised for other applications such as the drawing in or expelling of fluid.

FIG. 3 shows a three-dimensional cut-away view of a spherical primary chamber design that makes use of an external mechanism 5 with an internal spherical pistonin-cylinder arrangement 10 that can be designed with different fill densities to manipulate the starting volume of the primary chamber 6, with linear bearings 11 that improve alignment. The transformable geometry comprises disconnected rigid spherical surfaces (formers) 4 enveloped by an elastic membrane 1.

FIG. 4, FIG. 5 and FIG. 6 are illustrations of a hinged disk prism embodiment. FIG. 6 shows the device in the collapsed and expanded states to illustrate the expansion of the primary chamber 106. Similarly, FIG. 7 and FIG. 8 is the side and top view illustrations of this process. This example makes use of octagonal plates that are connected with hinges along the edges, but any polygonal shape could be employed. As the device is expanded, it gets taller and narrower and increases in volume. The primary variable-volume chamber 106 is enclosed by the primary chamber shell 101 that is sealed and can vary in size by employing a flexible elastic polymer material and/or transformable geometry. The secondary chamber volume 107 is enclosed by the fixed secondary chamber shell 102 and the expandable primary chamber shell 101 and could be replaced by installing the primary chamber 106 in any external medium. The elastic primary chamber shell 101 is supported by the rigid hinged disk structure (formers) 104 that is driven apart by an internal or external mechanism 105 housed within or external to the variable volume chamber 106. The mechanism 105 transfers the input energy to kinetic energy through a sealed interface/s. This drives the polygonal plates apart expanding the primary chamber volume 106. The primary chamber shell 101 is allowed to expand reducing the pressure within the primary chamber 106, up to the boundary of the sealed, rigid secondary chamber shell 102, if present. The secondary chamber 107 volume decreases, thereby increasing the pressure within the secondary chamber 107. The increasing pressure differential realized between the primary 106 and secondary chamber 107 is the potential energy stored. Note that if a flexible elastic polymer is employed as a seal for the primary chamber 106, it would provide additional energy storage as it elastically stretches to an increased surface area. A locking mechanism connected to input/output 105 prevents the system from contracting when the input energy is removed from the input/output 105 and enables the energy to be stored for later use. The process is reversed when the device is used to provide energy at a later stage. A number of output devices can be connected to the input/output 105 to provide, for example, reciprocating, rotating, translating motion, or a generator for electricity. Valved outlets 108 and 109 are connected directly to the primary and secondary chambers respectively. This enables low pressure vacuum 108 and high pressure outlet ports 109 to be utilised for other applications such as the drawing in or expelling of fluid.

Another embodiment of the invention can comprise a secondary chamber containing a plurality of expandable and contractable, sealed primary chambers, to benefit from modularity and scalability.

The invention can be scaled to any size, nominally for mechanical or tailored for electrical outputs, for powering personal devices, for large industrial applications or grid energy storage and it can be modular and made from a range of different materials to suit the application.

A potential application is for the device to drive an electrical generator which can be scaled to power portable electronics or to supply energy to a power grid. Surplus energy from a power grid can be stored and used later during peak times. During off-peak times, the surplus power can be used to run motors to drive the input mechanism, expanding the primary chamber until the device is fully charged. During peak times, the locking mechanism can be released to collapse the primary chamber, driving the output mechanism which can be coupled to a generator to deliver power back to the grid. This type of system could be modularised and scaled to include many primary chambers which could be charged and discharged either sequentially or in parallel.

The invention is well suited to energy storage for renewable energy power sources, such as solar, wind and tidal energy, where power is generated intermittently and during off-peak intervals. The energy can be stored in the ES device and provide an on-demand, controlled output to a power grid or off grid systems.

It can provide increased capacity for pumped-hydro power plants. It can be installed at the dam floor taking advantage of the hydrostatic pressure head, or it could be located elsewhere near the dam taking advantage of the grid connection infrastructure already available at the site. In areas where pumped hydro is not possible, the invention could be installed together with motor and generator infrastructure to provide the energy storage required. This means that the ES device can be located potentially anywhere reducing transmission losses and cost.

The invention can be installed at existing gas- or coal-fired power stations to provide increased capacity for peak power consumption periods and recharging it during off-peak times.

It could be used to develop an incentivised 'reward for effort' based biomechanical energy generator. Incentivise people or animals to provide the input kinetic or potential energy to the device.

Another application of the invention is to store power for portable devices. Such a device could be charged with a suitably geared electric motor, mechanical mechanism or other biomechanical input such as exercise. The device could then be operated by releasing the locking mechanism. The output mechanism would provide mechanical power through attachments to power useful mechanical drivers. Low powered electronics can be incorporated to better control the output of such devices. Types of useful drivers could be a rotational output, impact output, extension output or clasping output. Example applications of such drivers could be for mechanical equipment such as workshop tools, household cleaning and food processors and new applications such as friction heaters or self defence mechanisms.

It can be used as an energy storage and power unit to assist or enhance natural body movements, mobility or physical attributes such as strength, speed or reach. Such devices could be integrated into artificial limbs, exoskeletons or wearables.

Another application of the invention is in mechanical or motor drive systems in which the output mechanism is coupled to a drive shaft in order to provide additional torque when required, for example to replace the conventional battery and starter motor or improve efficiency during acceleration. When coupled with an electric motor or combustion engine, this could create a type of hybrid engine which may be more economical and light weight than current systems. The system could be trickle-charged during operation by the primary engine or otherwise plugged into an electric outlet for charging. For an electric vehicle, it has the added benefit of providing a lightweight energy storage unit that doubles as a propulsion unit when being discharged. This application could also extend to regenerative braking in vehicles by coupling the input/output mechanism to the drive system when the brake is actuated. The mechanism could be coupled in a way so that mechanical power from the drive system is used to expand the primary chamber, taking kinetic energy from the drive system, and slowing down the vehicle. The energy could then be locked into the primary chamber. When the vehicle accelerates, the locking mechanism can be released to discharge the primary chamber and supply power to the drive system and accelerate the vehicle. The regenerative process is purely mechanical and does not require energy to be converted to/from chemical or electrical energy.

Another application would be to use the system as an intermittent energy storage device to momentarily absorb energy when it is loaded and release the energy when it is unloaded. This would enable the system to be used as a spring-damper to reduce vibrations in a system, for example in vehicles. In such an application the geometry can be optimised for linear or non-linear spring coefficients, and it could be pre-pressurised to support the load at different rest states, or ride height for a vehicle.

Another application includes designing the device in the form of modular building blocks that can be stacked or interlocked in order to construct furniture or other structures. The structures themselves would provide energy storage. Furthermore, such structures may include output mechanisms to power mechanical devices. For example, the structure could have driven wheels enabling it to be moved, or rotating connection points to drive appliances or tools.

Another application would be to utilise the vacuum or high pressure available in the primary and secondary chambers, respectively, directly. Valves connected to the primary and secondary chambers allow for drawing in air or expelling air or a combination of drawing in and expelling air. For example, this would be well suited to operating musical wind instruments. This also allows the device to be used for vacuum-grabbing and holding applications. It can also be utilised for hermetically drawing in matter (solids, liquids or gases) and/or expelling matter. For example, it can be used to remove air and replace it with an inert gas in an oxidising environment. Both the vacuum and high pressure fluid flows can be used with a turbine-generator to produce electrical power.

Another application would be to use the valve port on the primary chamber to draw air out of containers, for the purpose of size reduction, food preservation, protection from elements and cleanliness purposes.

Another application includes thrust and energy storage in space environments. In space, the primary chamber intake valve or secondary chamber outlet valve can be open to a vacuum environment, to assist with the charging of the device and/or providing thrust.

For example, during normal operation, opening the intake valve of the primary chamber whilst or after the device is charged causes an ingress of the surrounding medium until the pressures equalise and the device is discharged. Alternatively, in a space application, the intake valve of the primary chamber can be open to a surrounding medium whilst being physically expanded and then be opened to a vacuum environment, through a nozzle, expelling the fluid, depressurising the chamber, simultaneously providing thrust and recharging the device. The recharged device can then be used to provide work.

Similarly, during normal operation, opening the outlet valve of the secondary chamber whilst the device is charging/charged, expels the fluid contained in the secondary chamber until the pressures equalise. Alternatively, in a space application, whilst or after physically expanding the device, the secondary chamber valve is open to a vacuum environment, through a nozzle, thereby providing thrust and assisting further expansion of the primary chamber, that is open to a surrounding medium, with an ingress of the surrounding medium fluid. The locking mechanism is engaged and then the secondary chamber valve is opened to a surrounding medium, filing it with the surrounding medium fluid. The primary chamber inlet valve is then open to a vacuum environment, through a nozzle, expelling the fluid, depressurising the chamber, simultaneously providing thrust and recharging the devise.

To design the invention for a given application, trade-offs are made to optimise for size and energy capacity. The chart in FIG. 10 shows the theoretical energy storage capacity of an expanding sphere embodiment of the invention for a range of device sizes (in terms of device volume). To produce the chart in FIG. 10, it is assumed that the spherical secondary chamber radius is double the size of the primary chamber radius, and the primary chamber radius can expand up to 99% of the secondary chamber radius. The expected energy capacity increases if the designed device size is increased. The energy capacity of a given device size can also be increased by pre-pressurising the secondary chamber prior to expanding the primary chamber. Increased initial secondary chamber pressure results in increased energy storage capacity.

A critical consideration is the maximum pressure inside the secondary chamber, as this drives the required strength and thickness of the secondary chamber materials. The pressure inside the secondary chamber increases as the primary chamber expands up to its maximum size.

The term "comprise" and variants of that term such as "comprises" or "comprising" are used herein to denote the inclusion of a stated integer or integers but not to exclude any other integer or integers, unless in the context or usage an exclusive interpretation of the term is required.

Those skilled in the art will appreciate that the invention described herein is susceptible to variations and modifications other than those specifically described. All such variations and modifications are to be considered within the scope and spirit of the present invention the nature of which is to be determined from the foregoing description.

The invention claimed is:

1. A device for storing mechanical energy, comprising:
an expandable and contractable, sealed primary chamber with a sealed variable internal volume containing an expandable/compressible primary fluid;
a medium that resists expansion of the primary chamber surrounds said primary chamber;
an input mechanism that increases the volume of said sealed primary chamber when energy is put into the device; and
an output mechanism that is driven by the primary chamber when it decreases in volume, due to a pressure differential, which allows energy to be extracted from the device;
wherein when the input mechanism is actuated by an external force, the sealed primary chamber increases in volume and the expanding fluid contained within reduces in pressure causing a partial vacuum pressure differential between the fluid and the surrounding medium; wherein when the external force is removed, the pressure differential works to decrease the volume of the sealed primary chamber driving the output mechanism.

2. The device of claim 1, wherein the sealed primary chamber volume is initially zero or a void, wherein when the input mechanism is actuated by the external force, the sealed primary chamber increases in volume maintaining a constant pressure differential between the void and the surrounding medium; wherein when the external force is removed, the constant pressure differential works to decrease the volume of the primary chamber driving the output mechanism.

3. The device of claim 1, wherein the primary chamber is enclosed by a rigid sealed secondary chamber containing the medium in the form of a compressible secondary fluid.

4. The device of claim 3, wherein the secondary chamber contains the compressible secondary fluid which increases in pressure as it takes the shape of the contracting secondary chamber internal volume, due to the expanding primary chamber, storing energy in an increasing pressure differential; wherein energy is released when the pressure differential works to collapse the primary chamber, thereby expanding the secondary fluid back to its original volume.

5. The device of claim 1, wherein said device acts as a spring-damper for damping mechanical vibrations.

6. The device of claim 1, further comprising a locking mechanism for selectively preventing expansion or contraction of said primary chamber to maintain a steady volume of said primary chamber, thereby enabling the storage of energy.

7. The device of claim 6, wherein the locking mechanism is a ratchet and pawl mechanism which, when engaged, mechanically prevents said primary chamber from decreasing in volume thereby allowing energy to be stored.

8. The device of claim 6, wherein said primary chamber can be decoupled from the input and/or output mechanism, transported, and reconnected to a different input and/or output mechanism.

9. The device of claim 6, wherein disengaging said locking mechanism allows stored energy to be discharged.

10. The device of claim 1, wherein said primary chamber is comprised of a flexible or transformable geometry shell; the flexible or transformable geometry shell makes use of an elastomer material, rigid sliding or hinging formers or a combination thereof, that provides rigid support whilst maintaining a pressure seal for the primary chamber when expanding or contracting and subjected to a pressure differential wherein said formers are actuated by, or drive, said input and/or output mechanism, wherein when the formers are actuated to expand the transformable shell, the fluid contained in the primary chamber expands and decreases in pressure with a partial vacuum; whereby a pressure differential is created between the primary chamber and the external medium; whereby energy is released when the pressure differential works to collapse the primary chamber, thereby recompressing the primary fluid and driving the output mechanism.

11. The device of claim 10, wherein said primary chamber shell is spherical or spherical polyhedron in shape.

12. The device of claim 10, wherein said primary chamber shell is prismatic in shape.

13. The device of claim 10, wherein said primary chamber shell is a bellows.

14. The device of claim 1 wherein an energy convertor is connected to the input and/or output mechanism.

15. The device of claim 14, wherein said energy converter is an electrical generator.

16. The device of claim 1, wherein the primary fluid is air.

17. The device of claim 1, wherein the primary fluid is a phase change material.

18. The device of claim 1, wherein the medium is air.

19. The device of claim 1, wherein the medium is a phase change material.

20. The device of claim 17, wherein said phase change material is a two-phase refrigerant.

21. The device of claim 1 wherein said medium is water.

22. The device of claim 1, wherein said primary chamber has a fluid intake valve; wherein:
opening intake valve unseals said primary chamber and causes an exchange with said surrounding medium such that the pressures equalise;
opening said intake valve of a charging/charged primary chamber to a surrounding medium, unseals said chamber and results in an ingress of surrounding medium until the pressures equalise, thereby discharging the device; and
opening said intake valve, of a physically expanded primary chamber, to a vacuum environment, unseals the primary chamber and results in primary fluid being expelled, thereby depressurizing the chamber to a partial vacuum, simultaneously providing thrust, and recharging the device, whereby the valve is then closed to store the energy.

23. The device of claim 3, wherein said secondary chamber has a fluid outlet valve; wherein,
opening said outlet valve causes an exchange with a medium external to said secondary chamber such that the pressures equalize;
opening said outlet valve while the device is charging/charged, to a medium external to said secondary chamber, expels the pressurised secondary fluid contained in the secondary chamber, until the pressures equalise; and opening said outlet valve to a vacuum environment, after physically expanding the device, results in secondary fluid being expelled whilst the secondary chamber depressurizes to an internal partial vacuum, thereby assisting the expansion of the primary chamber, whereby, once the primary chamber is charged, the secondary chamber outlet valve can be opened to a medium external to said secondary chamber to repressurise it and increase the pressure differential between the primary and secondary chambers.

24. The device according to claim 23, wherein plurality of devices is incorporated in a system and an intake valve of each device is coupled via a manifold.

25. The device according to claim 24, wherein the outlet valve of each device is coupled via a manifold.

\* \* \* \* \*